Sept. 2, 1947.  D. H. STROUP  2,426,955
INDICATOR FOR AIRPLANE ENGINES
Filed July 13, 1943
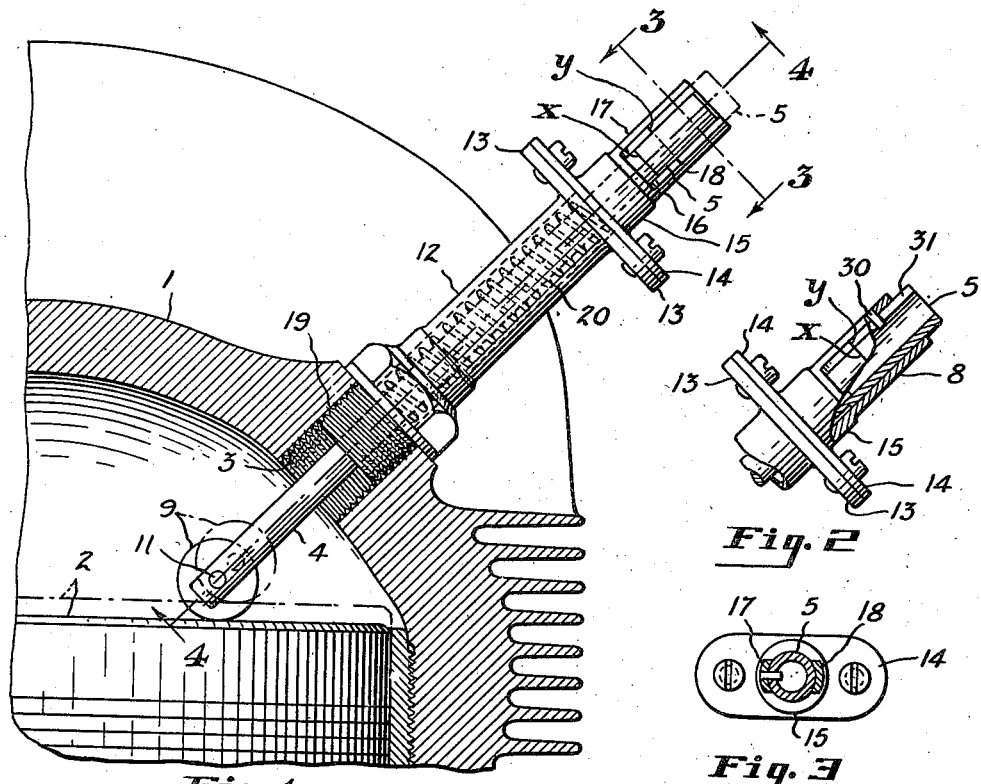
Fig.1
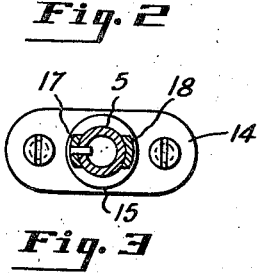
Fig.2
Fig.3
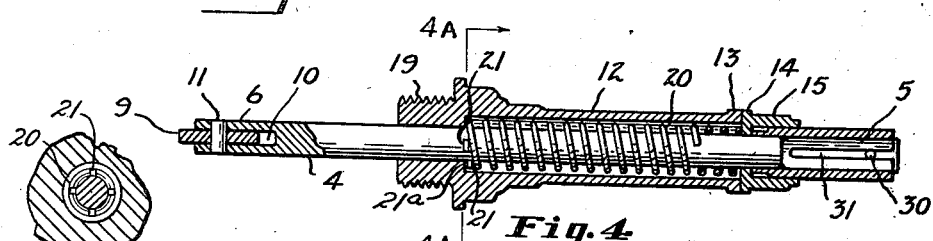
Fig.4
Fig.4A
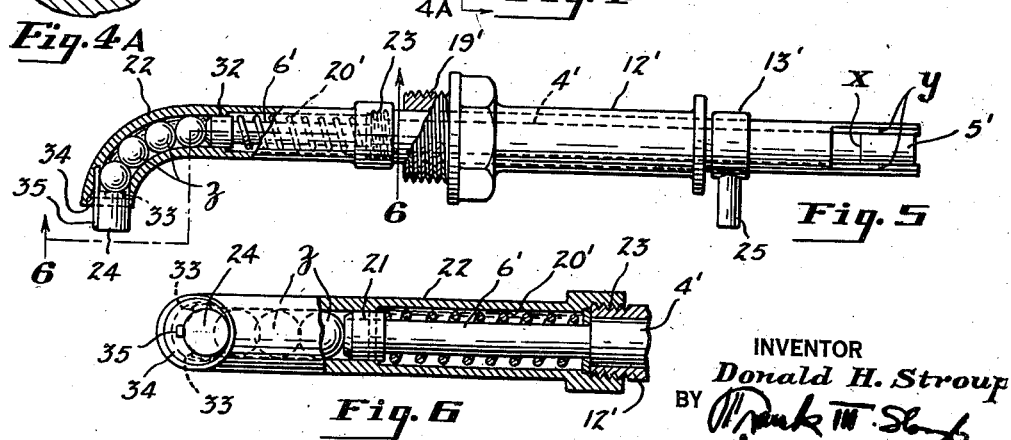
Fig.5
Fig.6
INVENTOR
Donald H. Stroup
BY
His ATTORNEY Patented Sept. 2, 1947

2,426,955

UNITED STATES PATENT OFFICE 2,426,955

INDICATOR FOR AIRPLANE ENGINES

Donald H. Stroup, Lakewood, Ohio, assignor to Mary McLaughlin Stroup, Lakewood, Ohio Application July 13, 1943, Serial No. 494,561

8 Claims. (Cl. 33—169)

My invention relates to airplane engines and relates more particularly to an indicator for obtaining top center position of the piston whereby accurate adjustment of the timing mechanism of an airplane engine may be secured.

The indicator of my invention is particularly adapted for use in determining the top center position of the piston travel in engines for aircraft, which engines have their spark plugs disposed at an acute angle or at right angles to the position of such piston travel in the cylinders.

It is an object of my invention to provide an indicating means of the type described for use in such said aircraft engines which will be simple in operation, efficient in use and economical in manufacture.

Another object of my invention is to provide indicating means of the type described which will be highly accurate and which may be used by the ordinary mechanic with extreme ease.

Another object of my invention is to provide indicating means of the type referred to which will be sturdy in construction and composed of but few parts, being durable in use.

Other objects of my invention and the invention itself will become increasingly apparent from reference to the specification and drawings herein, wherein:

Fig. 1 is a vertical sectional view through a portion of the cylinder and showing the piston of an aircraft engine, wherein the spark plug is disposed at a 45° angle to the piston, showing the indicator of Figs. 2, 3 and 4, applied thereto; the dotted lines indicating further operative positions of the piston and indicator upon further piston travel on the upstroke in the cylinder;

Fig. 2 is a fragmentary elevational view of the measuring device of Fig. 1 with parts broken away;

Fig. 3 is a sectional view taken from the line 3—3 of Fig. 1;

Fig. 4 is a sectional view of the indicator of Fig. 1 taken on line 4—4 of Fig. 1;

Fig. 4a is a fragmentary sectional view of parts shown in Figs. 1 and 4 inclusive, taken on the line 4a—4a of Fig. 4.

Fig. 5 is an elevational view of another embodiment of my invention as applied to the spark plug opening of a cylinder of an airplane engine which is disposed at approximately a 90° angle to the piston; and Fig. 6 is an enlarged sectional view taken from the line 6—6 of Fig. 5.

It will be noted, by reference to the drawing, that the indicator of my invention, as exemplified by the several forms of Figs. 1 to 6 inclusive, is the type adapted to be inserted in the spark plug opening in the cylinder head, said indicator being disposed and supported in such opening and having movable means associated therewith adapted to contact the head of the piston on the upstroke thereof, said movable means projecting outwardly from the spark plug opening whereby an indication of the amount of such upward travel of the piston may be obtained to determine the top center position of the crank shaft throw.

It is to be noted that in the embodiment of my invention shown in Figs. 1 to 4 inclusive, the indicator is disposed in a spark plug opening which is disposed at a 45° angle in the cylinder and with relation to the direction of piston travel.

In this form of my invention, at 1 I have indicated a cylinder of an airplane engine of the type referred to having a piston 2 mounted therein. At one side of said cylinder 1, I show a spark plug opening 3 provided for the reception of a spark plug. When it is desired to obtain an indicator reading of the piston, the spark plug is removed and the indicator of my invention inserted or screw-threaded, as shown in Fig. 1, therein.

The indicator comprises a movable shaft 4 having an enlarged outer end portion 5 and an inner end portion 6, the outer end portion 5 having various indicia thereon, as shown at $x$, for purposes later to be described, and the inner end portion 6 having a wheel 9 disposed within a slot 10 provided within the inner end of the shaft 4, the wheel 9 being secured to the shaft by pin means 11, said wheel being freely movable therein and rotatable about the pin 11 upon which it is mounted.

A sleeve or body portion 12 is further provided, adapted to be telescoped over a mid-portion of the shaft 4, the shaft being longitudinally movable therein when in its operative relation with the piston. This body portion 12 is shown constructed, in the form of Figs. 1 to 4 inclusive, with an outwardly extending shoulder portion 13, said shoulder portion being adapted to be secured to a shoulder portion 14 carried by a collar 15 disposed about the upper end portion of said body member 12, said collar 15 terminating in a split sleeve member 16 forming a pair of spaced upwardly extending neck members 17 and 18, said members being disposed on opposite sides of the enlarged end portion 5 of the shaft 4 and provided further with indicia adapted to align with the indicia carried by the enlarged end portion 5 of the shaft 4 whereby a reading may be secured, said reading corresponding to the degree of travel of the piston on its upstroke, as ascertained by a method later herein to be more fully described.

It will be noted that the shaft 4 is provided with a slot 31 within which a pin 30, secured to and disposed through the split sleeve 16, is adapted to be projected and ride.

The body portion 12 further carries, at its inner end, a screw-threaded portion 19 whereby the indicator of my invention may be screw-threaded within the spark plug opening 3, shown in Fig. 1.

Within the body member 12, and also telescoped over the shaft member 4, is a spring member 20 adapted to abut, at its inner end, upon shoulders 21—21 carried by the shaft 4, which, in turn, abuts upon inturned shoulders 21a—21a carried by the body member 12, and against the shoulder portion 14 of the collar 15 at its upper end, the said spring member 20 exerting force upon the shaft member 4 whereby said shaft is adapted to exert tension on the wheel 9 which rides, as hereinafter described, on top of the piston.

In operation, to obtain top center position of the piston, a spark plug is removed, as described, from the so-called "No. 1" engine cylinder of an airplane engine and the indicating device of my invention inserted therein, the body portion 12 being screwed into the spark plug opening 3, the wheel 9 and shaft 4 having been first inserted through the opening, and, as shown in Fig. 4, the wheel 9 is thereby placed in operating position when the head of the piston on its upstroke makes contact with said wheel.

The enlarged outwardly extending shoulders or bars 13 and 14 are used to secure alignment of the wheel 9 with the piston travel so that said wheel may be disposed in direct point contact with the piston, since the bars are used for adjustment of the indicator in the spark plug opening to place the roller or wheel 9 in proper position.

The engine is now turned by manually moving the propeller, the motor being turned over clockwise to rotation on the compression or power stroke, the operator continuing to turn the propeller and the motor in clockwise or motor-operating direction until the head of the piston contacts the wheel 9; then, as the piston continues to rise, the shaft 4 is forced upwardly against the action of the spring 20 and the wheel or roller 9 rolls back towards the cylinder wall, as shown in dotted lines in Fig. 1.

The propeller movement is continued until a line such as x on the shaft 4 coincides with the lines y—y on the neck members 17 and 18 of the split sleeve 16. At this point, movement of the propeller is discontinued and the operator makes a pencil marking or the like on the nose of the propeller or on a quadrant placed thereon for this purpose, at the point thereon where the crank shaft protrudes through the crank case. For example, aligned markings may be made on the movable collar of the propeller shaft and on the engine nose.

When this marking is made, the operator then continues the movement of the propeller until it approaches the starting position. The engine is now turned counterclockwise by manually moving the propeller until the indicator shaft 4 again begins to rise due to a second upstroke movement of the piston and contact of the piston head with the roller 9 being effected; the operator continues to turn the propeller and the shaft 4 continues to rise in response to upward piston travel until the line x again coincides with the line y. The propeller movement is now discontinued and a new marking is made on the propeller nose of the quadrant at the point where the crank shaft now protrudes through the crank case.

The marking on the movable collar would now determine the point on the engine nose on which the aligned marking should be made.

The operator next divides the distance between the first and second marking on the engine nose plate and marks the exact center of this distance on the engine nose plate or quadrant. He then brings the crank shaft and with it the marking to this center position on the movable collar. The position now occupied by the crank shaft is the absolute top center position of the crank shaft throw on this particular cylinder and a predetermined adjustment suitable for top efficiency of the particular engine now set.

In the form of my invention shown in Figs. 5 and 6, the same direct action is secured in the indicator even though the indicator of this embodiment is constructed so as to be disposed in contact with a piston traveling at a 90° angle to the spark plug opening in the cylinder through which the indicator operates.

This indicator is formed with a longitudinally movable shaft 4' having an outer end 5', bearing indicia similar to that carried by the shaft end 5 of Figs. 1 to 4 inclusive, and a reduced inner end 6' having a plunger 32 associated therewith. The shaft 4' in this embodiment has a spring 20' telescoped thereover adjacent its inner end 6' and said spring is adapted to abut the plunger 32 which contacts ball bearings z interposed in a tube 22, said tube being screw-threaded over the threaded end 23 of the body portion 12' constructed generally similar to the body member of the first embodiment.

The tube 22, it will be noted, is curved adjacent its free end and the ball bearing roller means z are disposed throughout the curve and are used to translate the upward movement of the piston communicated through the balls by their contact with the plunger 24, disposed in the tube 22 in such manner as to permit sliding movement therewith.

This plunger 24 is retained in the tube 22 by projections 33 carried by the plunger and resting on a crescent shaped bushing 34 secured in the end of the tube 22 by press fit or otherwise. The plunger 24 also carries a key 35 adapted to engage a slot in the bushing 34 whereby the sliding movement described is achieved.

The shaft 4' is thus moved by the travel of the piston and readings taken at the outer end thereof, as in Figs. 1 to 4 inclusive. The collar 13' and associated handle 25 are utilized to align the movable plunger 24 with the piston. Throughout the entire translatory action of this indicator, a minimum of friction occurs and the ball bearings prevent any binding between parts. Hence, in this indicator, as in the indicator of Figs. 1 to 4 inclusive, a direct accurate picture of piston movement is secured.

Although in this specification, I have referred to specific steps in calculating the top center position of the piston, it is to be understood that any desired method of calculation might be used and that various operators would use the measurements secured by the indicator for various purposes and my invention is not limited to such methods.

I claim:

1. An indicator of the type described for airplane engines having spark plugs disposed at an angle to the cylinder, said indicator comprising a body portion adapted to be secured in the spark plug opening, said body portion being telescoped over a shaft, said shaft being adapted to move longitudinally therein and bearing indicia at its free end and roller means at its opposite end, said roller means disposed in the path of the piston whereby the piston head may contact the same and said shaft be moved thereby whereby the indicia carried by the shaft is adapted to be aligned with indicia carried by the free end of said body portion for obtaining a reading corresponding to the travel of said piston.

2. A top center indicator adapted to be inserted through a spark plug opening disposed at an angle to a cylinder of an airplane engine in the path of a piston, said indicator comprising a tubular body member, said body member having means adapted to be lockingly engaged with the spark plug openings whereby said indicator may be securely retained in the spark plug opening, a shaft longitudinally movable within said body member, said shaft having roller means disposed at its inner end and adapted to engage said piston upon its upstroke and to be moved thereby on the piston head towards the cylinder wall, the shaft being moved with the roller means and traveling longitudinally in the body member whereby indicia carried by the upper end of said shaft may be used to obtain a reading corresponding to the degree of travel of the piston.

3. An indicator of the type described for airplane engines having spark plugs disposed at an angle to the cylinder, said indicator comprising a body portion adapted to be secured in the spark plug opening, said body portion being telescoped over a shaft, said shaft being adapted to move longitudinally therein and bearing indicia at its free end and roller means at its opposite end, upstroke movement of said piston communicating through said roller means movement to said shaft whereby said shaft is moved whereby the indicia carried by the shaft is adapted to be aligned with indicia carried by the free end of said body portion for obtaining a reading corresponding to the travel of said piston.

4. A top center indicator adapted to be inserted through the spark plug opening of an airplane engine cylinder in the path of a piston, said indicator having a body member adapted to be screw threaded into the spark plug opening, said indicator and spark plug opening being disposed at an acute angle to said cylinder and piston, means longitudinally movable with respect to said body member and telescoped therein, said means bearing indicia at its upper end portion and roller means rotatably secured thereto at its inner end portion, spring means telescoped over said first named means and seated within said body member, said spring means effective to exert pressure upon said first named means and said roller means, the piston on its upstroke being adapted to contact said roller means moving said roller means towards the cylinder wall and forcing the said first named means upwardly through the spark plug opening whereby said indicia may be noted to obtain a reading of the piston travel.

5. A top center indicator adapted to be inserted through the spark plug opening of an airplane engine cylinder in the path of a piston, said indicator having a body member adapted to be screw threaded into the spark plug opening, said indicator and spark plug opening being disposed at an acute angle to said cylinder and piston, a shaft longitudinally movable with respect to said body member and telescoped therein, said shaft bearing indicia at its upper end portion and roller means rotatably secured thereto at its inner end portion being retained in a slot disposed in the said inner end portion of said shaft, spring means telescoped therein, said shaft end seated within said body member, said spring means effective to exert pressure upon said shaft and said roller means, the piston on its upstroke being adapted to contact said roller means moving said roller means towards the cylinder wall and forcing the said shaft upwardly through the spark plug opening whereby said indicia may be noted to obtain a reading of the piston travel.

6. A top center indicator adapted to be inserted through a spark plug opening disposed at an acute angle to a cylinder of an airplane engine in the path of a piston, said indicator being disposed at the angle of said spark plug opening to said cylinder and having shaft means disposed in said spark plug opening provided with a slot adjacent its inner end, a wheel disposed within said slot and secured to said shaft means and freely rotatable in said slot, a body member telescoped over said shaft means and screw threaded within the spark plug opening, spring means telescoped over said shaft means and within said body member adapted to exert pressure upon said shaft means and tension on the wheel disposed therein, means secured to said body member at its outer end comprising a split sleeve member having indicia thereon, said shaft means having an outer end portion associated with the outer end portions of the said split sleeve member disposed on opposite sides thereof and provided with indicia adapted to be read in connection with the indicia of the split sleeve member when movement of the shaft effected by movement of the piston and the wheel against the pressure of the spring occurs.

7. A top center indicator adapted to be inserted through a spark plug opening disposed at an acute angle to a cylinder of an airplane engine in the path of a piston, said indicator being disposed at the angle of said spark plug opening to said cylinder and having shaft means disposed in said spark plug opening provided with a slot adjacent its inner end, a wheel disposed within said slot and secured to said shaft means and freely rotatable in said slot, a body member telescoped over said shaft means and screw threaded within the spark plug opening, spring means telescoped over said shaft means and within said body member adapted to exert pressure upon said shaft means and tension on the wheel disposed therein, means secured to said body member at its outer end comprising a split sleeve member having indicia thereon, an enlarged outer end portion of the shaft carrying indicia, said split sleeve member being disposed on opposite sides thereof, the indicia carried by the split sleeve member and shaft adapted to cooperate to secure readings of the piston movement, the shaft outer end portion having a longitudinal groove disposed therein wherein pin means secured to said split sleeve member are adapted to ride whereby any lateral shifting of the split sleeve member with respect to the shaft member and said body portion is eliminated and only longitudinal movement of the shaft with respect to the body member is effected upon movement of the piston and the wheel against the pressure of the spring occurs.

8. A top center indicator adapted to be inserted through a spark plug opening disposed at an acute angle to a cylinder of an airplane engine in the path of a piston, said indicator being disposed at the angle of said spark plug opening to said cylinder and having shaft means disposed in said spark plug opening provided with a slot adjacent its inner end, a wheel disposed within said slot and secured to said shaft means and freely rotatable in said slot, a body member telescoped over said shaft means and screw threaded within the spark plug opening, spring means telescoped over said shaft means and within said body member adapted to exert pressure upon said shaft means and tension on the wheel disposed therein, means secured to said body member at its outer end comprising a split sleeve member having indicia thereon, an enlarged outer end portion of the shaft carrying indicia, said split sleeve member being disposed on opposite sides thereof, the indicia carried by the split sleeve member and shaft adapted to cooperate to secure readings of the piston movement, the shaft outer end portion having a longitudinal groove disposed therein wherein pin means secured to said split sleeve member are adapted to ride whereby any lateral shifting of the split sleeve member with respect to the shaft member and said body portion is eliminated and only longitudinal movement of the shaft with respect to the body member is effected upon movement of the piston and the wheel against the pressure of the spring occurs, aligning means carried by said body member whereby the wheel may be disposed within the cylinder at the desired angle of contact with the piston head.

DONALD H. STROUP.

REFERENCES CITED

The following references are of record in the file of this patent:

UNITED STATES PATENTS

| Number | Name | Date |
|---|---|---|
| 1,737,726 | Muzyn | Dec. 3, 1929 |
| 1,782,142 | Havens | Nov. 18, 1930 |
| 807,555 | Henrikson | Dec. 19, 1905 |
| 2,320,192 | Palmer | May 25, 1943 |
| 1,683,710 | Zitzmann | Sept. 11, 1928 |

FOREIGN PATENTS

| Number | Country | Date |
|---|---|---|
| 359,631 | Germany | Sept. 25, 1922 |
| 684,213 | France | Mar. 17, 1930 |
| 489,390 | France | Sept. 24, 1918 |
| 130,195 | Great Britain | July 31, 1919 |
| 145,338 | Great Britain | July 2, 1920 |